US008491150B2

(12) United States Patent
Fogerlie

(10) Patent No.: US 8,491,150 B2
(45) Date of Patent: Jul. 23, 2013

(54) SOLAR LIGHT ASSEMBLY WITH ADJUSTABLE LIGHT HOUSING

(76) Inventor: Sivert G. Fogerlie, Glendale, AZ (US)

(*) Notice: Subject to any disclaimer, the term of this patent is extended or adjusted under 35 U.S.C. 154(b) by 390 days.

(21) Appl. No.: 12/824,153

(22) Filed: Jun. 26, 2010

(65) Prior Publication Data

US 2010/0328932 A1 Dec. 30, 2010

Related U.S. Application Data

(60) Provisional application No. 61/269,679, filed on Jun. 29, 2009.

(51) Int. Cl.
*F21L 4/02* (2006.01)
*F21L 4/04* (2006.01)

(52) U.S. Cl.
USPC ...... 362/192; 362/239; 362/240; 362/249.03; 362/249.07; 362/249.1; 362/287; 362/372; 362/419

(58) Field of Classification Search
USPC ............ 362/183, 192, 238, 239, 240, 249.03, 362/249.07, 249.1, 269, 285, 287, 365, 366, 362/372, 418, 419
See application file for complete search history.

(56) References Cited

U.S. PATENT DOCUMENTS

| 2,572,825 | A | | 10/1951 | Guth |
| 2,922,030 | A | | 1/1960 | Bobrick |
| 3,702,928 | A | * | 11/1972 | Alger ............................. 362/33 |
| 3,974,371 | A | * | 8/1976 | Miles, Jr. ....................... 362/341 |
| 4,031,385 | A | * | 6/1977 | Zerlaut et al. ............... 250/203.4 |
| 4,200,904 | A | * | 4/1980 | Doan ............................. 362/183 |
| 4,232,361 | A | | 11/1980 | Kelsall |
| 4,281,369 | A | * | 7/1981 | Batte ............................. 362/183 |
| 4,887,196 | A | | 12/1989 | Brown et al. |
| 4,977,488 | A | * | 12/1990 | Spotts et al. .................. 362/183 |
| 5,149,188 | A | * | 9/1992 | Robbins ........................ 362/183 |
| 5,803,585 | A | * | 9/1998 | Littman et al. ................ 362/147 |
| 6,060,658 | A | * | 5/2000 | Yoshida et al. ................ 362/183 |
| 6,402,352 | B1 | | 6/2002 | Summerford et al. |
| 6,450,668 | B1 | * | 9/2002 | Kotloff ........................ 362/269 |
| 6,893,139 | B2 | * | 5/2005 | Cercone et al. ............... 362/147 |
| 6,948,826 | B2 | * | 9/2005 | Fogerlie ........................ 362/183 |
| 7,093,959 | B2 | | 8/2006 | Tsao |
| 7,298,969 | B2 | | 11/2007 | Elberbaum |
| 8,235,544 | B2 | * | 8/2012 | Fogerlie ........................ 362/183 |

* cited by examiner

*Primary Examiner* — Ismael Negron
(74) *Attorney, Agent, or Firm* — The Hill Law Firm, PLC; Scott A. Hill

(57) ABSTRACT

A solar light assembly includes a plurality of housings each having a light, a frame receiving the plurality of housings, and a solar panel substantially positioned over the frame. Each housing including a face, sides and a lip, such that the face and lip lie in intersecting planes. Each housing is removable from the frame to be rotated and repositioned within the frame. A pole could be used to support the frame.

8 Claims, 12 Drawing Sheets

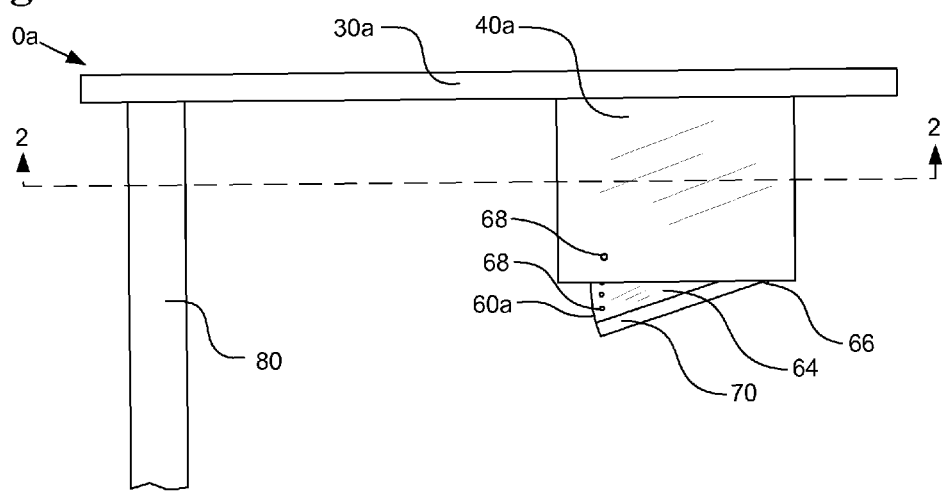
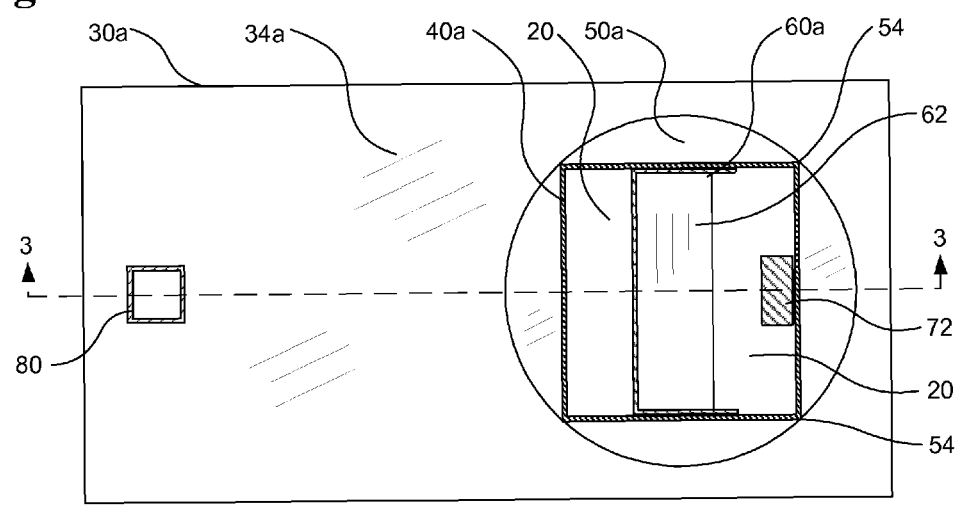

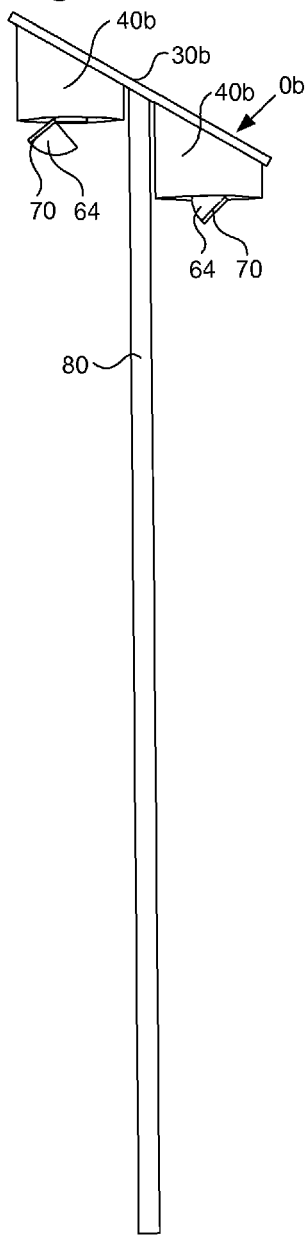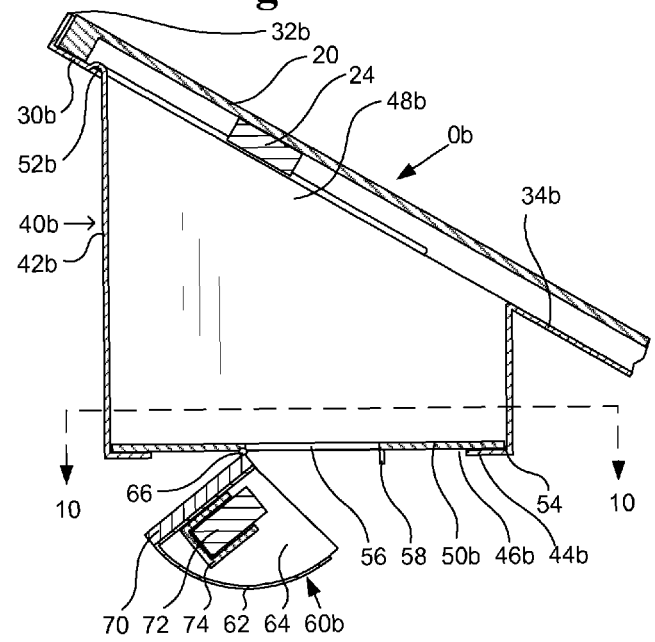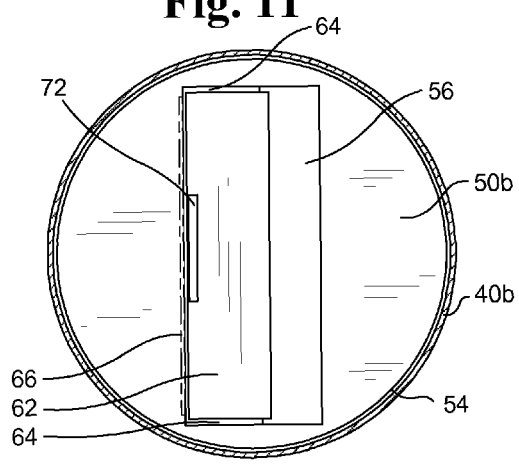

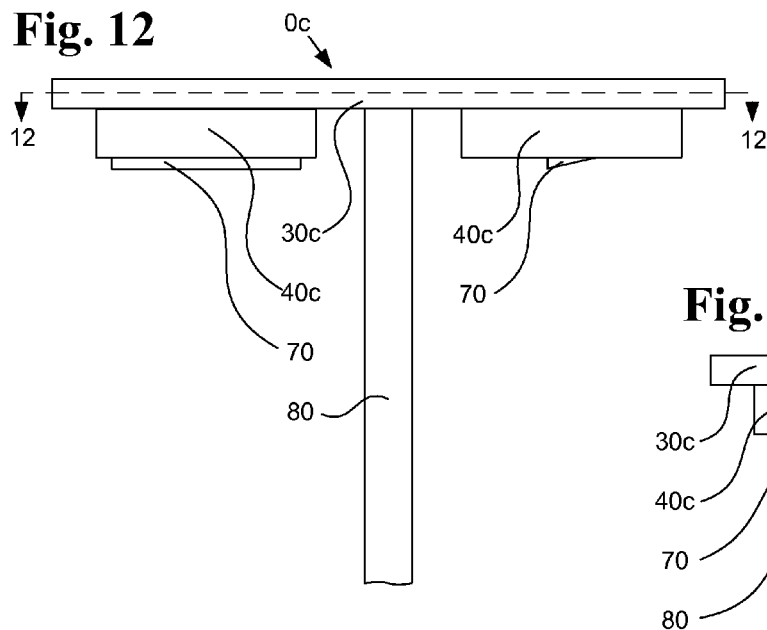
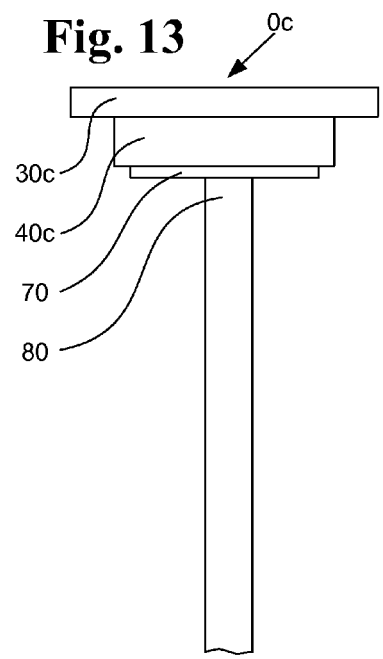
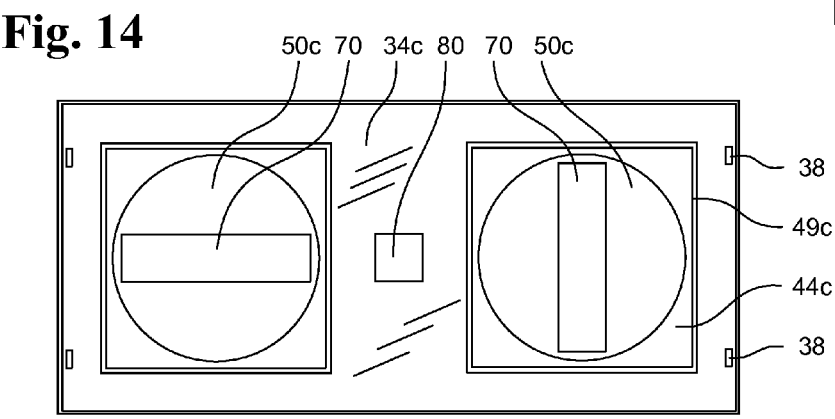

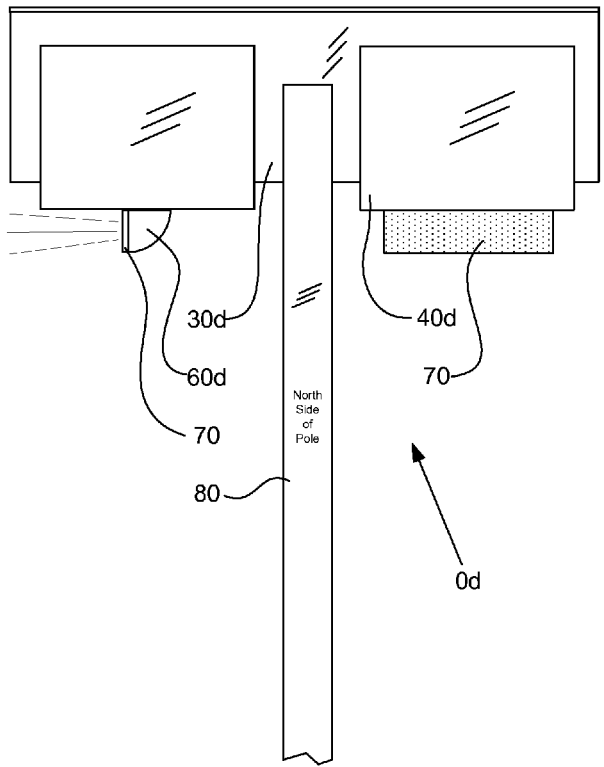
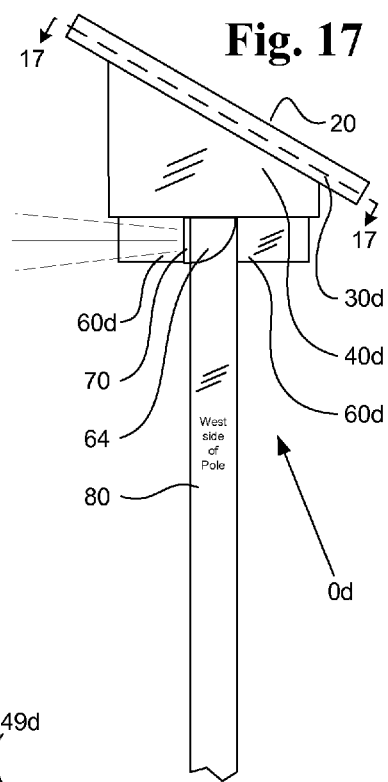
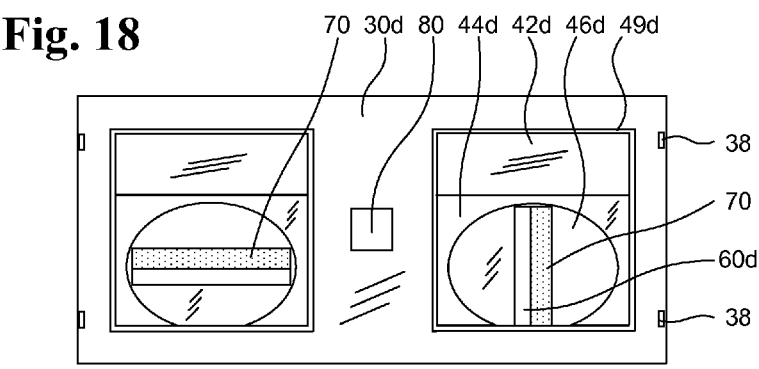

SOLAR LIGHT ASSEMBLY WITH ADJUSTABLE LIGHT HOUSING

RELATED U.S. APPLICATION DATA

This application claims the benefit of priority of U.S. Provisional Application No. 61/269,679, filed on Jun. 29, 2009, and titled "Solar Light Assembly for Street and Park Lighting", incorporated herein by reference in its entirety.

BACKGROUND OF THE INVENTION

Solar panels are frequently used to recharge batteries during the day that then subsequently are able to power lights at night. Solar panels may serve multiple functions, and, although it is very common for a solar panel to be positioned away from a light source, some outdoor light assemblies use a solar panel as a cover to a container that contains electronics and other components that need to be protected against water exposure and inclement weather. Solar light assemblies may be positioned at variable heights from the ground, with variable difficulty and safety issues associated. It is safe and easy to service solar light systems that are close to the ground, such as walkway and construction lights. For larger outdoor light assemblies, such as those that can provide street or park lighting, the light is frequently mounted several meters above the ground on a pole, such as those shown in U.S. Pat. Nos. 6,060,658, 5,149,188, 4,281,369 and 4,200,904. It is not a simple task to remove a solar panel mounted high above the ground for the purpose of accessing electronics when servicing is required. In order to make a light assembly more versatile, it is advantageous to be able to adjust the direction of a light rather than always having a light that shines straight down.

A further consideration is the balance between aesthetics, the direction a light needs to shine, and the orientation of a solar panel relative to the southern sky (for the northern hemisphere). When more than one light is incorporated into a single pole mounted light assembly, the posture of a solar panel ideally angles the panel toward the southern sky, but a solar panel can be postured in a southerly direction many different ways. Usually, it is considered to be more aesthetically pleasing to keep a perimeter of a rectangular solar panel parallel to a reference plane, so there are two preferred ways to posture a rectangular solar panel: a vertical posture or a horizontal posture. A light assembly designed for a particular orientation and tilt of the solar panel will determine the position of a pole and, therefore, the lights. Even if the lights are fully adjustable, the pole might happen to block one of the lights from pointing in a desired direction, so there is also a need for versatility with regard to the posture of a solar panel on a two light solar lighting system so the pole doesn't undesirably interfere with the light cast.

SUMMARY OF THE INVENTION

The present invention is a solar powered light system that is a suitable alternative to conventional pole mounted street or park lighting, especially for areas that are not already supplied with power. A light having a shroud is hingedly attached to a housing. The shroud allows the light to be tilted such that it can provide vertical illumination of the ground, and by tilting the light, horizontal illumination. There are numerous tilt positions between these two extremes to provide a broad range of illumination. By excessively tilting the light beyond 90 degrees, the shroud swings away from the housing to expose the contents of the housing. With this easy access to the inside of the housing, there is no longer a need to remove the solar panel that covers the housing. Although a light assembly can be flat mounted to disguise the presence of a solar panel, the solar panel may be tilted to face south such that the light of the sun is more efficiently converted into power. An additional benefit of the present invention is that the solar panel itself may be used as a protective cover, or lid, for the housing of the solar light assembly which contains weather-sensitive components.

For additional versatility when installing a solar light assembly, a frame that supports a solar panel can be designed to accept different housings in different orientations. A frame mounted in a horizontal plane will cause a solar panel to face straight up, so when a light pole is installed in the ground there is no need to consult a compass. A flat mounted frame should be used with flat mounted housings to provide maximum versatility. For a frame to be postured to face the southern sky, the pole needs to be rotated correctly to cause the solar panel to be postured toward south. A postured frame should be used with sloped housings. Because convention has caused virtually all commercially available solar panels to be rectangular, a sloped housing can ideally be rotated 90 degrees such that the solar panel can face the southern sky by assuming either a horizontal posture or a vertical posture. This is beneficial during the installation of a solar light assembly to prevent a situation where a light pole is blocking a light from shining in a desired direction. At an installation site, the housings can be lifted out of the frame, rotated 90 degrees, and then dropped back into the frame before the solar panel is secured as a cover for the frame and housings. Once this is done, the solar light assembly can be installed with a southern vertical posture rather than a southern horizontal posture, or vice versa.

BRIEF DESCRIPTION OF THE DRAWINGS

FIG. 2 is a side view of the solar powered light assembly of FIG. 1, including part of the pole.

FIG. 3 is a cross section, looking up, through line 2-2 of FIG. 2.

FIG. 9 is a side view of an alternate embodiment of the present invention, showing the full length of the pole.

FIG. 10 is a cross section of part of a light assembly that could be used with the assembly in FIG. 9, which uses a solar panel that is angled toward South.

FIG. 11 is a cross section through line 10-10 of FIG. 10.

FIG. 12 is a front view of an alternate embodiment of the present invention using a frame mounted flat.

FIG. 13 is side view of the solar light assembly of FIG. 12.

FIG. 14 is a cross section, looking down, through line 12-12 of FIG. 12.

FIG. 16 is a front view of an alternate embodiment of the present invention using a frame mounted with a horizontal posture.

FIG. 17 is a side view of the alternate embodiment of FIG. 16.

FIG. 18 is a cross section, substantially looking down, through line 17-17 of FIG. 17.

Figure 1:
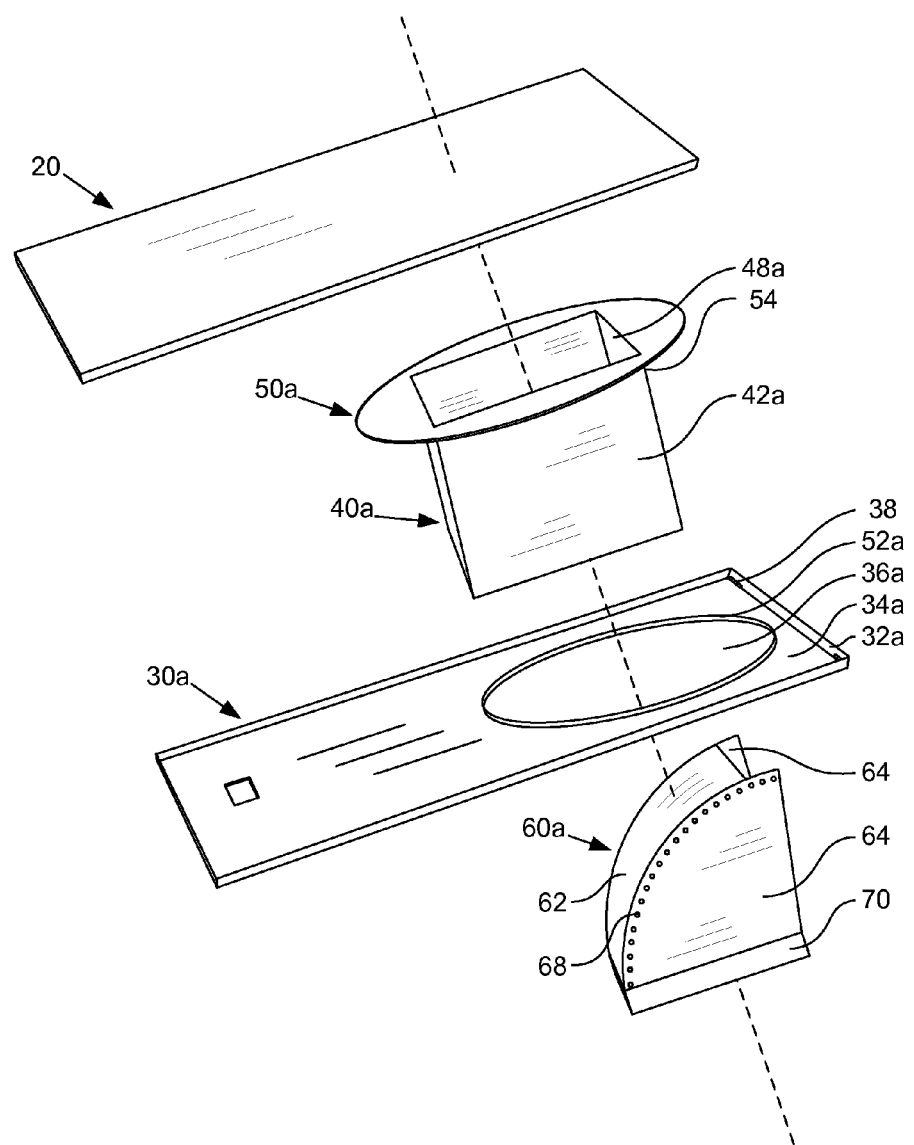
FIG. 1 is an exploded perspective view of a solar light assembly of the present invention.

The following is the list of numerical callouts used in FIGS. 1-25:
- 0 solar light assembly
- 20 solar panel
- 24 junction box
- 30 frame
- 32 edges
- 34 tray portion
- 36 hole
- 38 drainage passageway
- 40 housing
- 42 sides
- 44 face
- 46 aperture
- 48 cavity
- 49 lip
- 50 disc
- 52 rain barrier ridge
- 53 gap
- 54 guide
- 56 opening
- 58 tab
- 60 shroud
- 62 arcuate portion
- 64 triangular sides
- 66 hinge
- 68 adjustment holes
- 70 light
- 72 system controller
- 74 holder
- 80 pole

DETAILED DESCRIPTION OF THE INVENTION

The focus of the present invention is on combining a tilt feature of a solar light system with easy access to electrical components that may need to be serviced or replaced. An additional benefit is combining the above features with the ability to rotate a tilted light 360 degrees, thereby giving a very broad illumination range. This detailed description will begin by describing the first preferred embodiment, shown in FIGS. 1-7, of the solar light assembly substantially from the top down, as assembled. Next, the first alternate embodiments, shown in FIGS. 8-11, will be described. Finally, the second preferred embodiment is shown in FIGS. 12-15, and then the second alternate embodiments, shown in FIGS. 16-25, will be described. Throughout the remainder of this description, the term "top" refers to that surface or portion of a part or feature that is relatively closest to the top of one of the exploded perspective views. Generally, a solar light assembly 0a uses a solar panel 20 that is supported by a frame 30a to cover at least one housing 40a that houses components of the system. A disc 50a that is either part of a housing, or that rotates against a housing, provides rotational adjustment of a light 70. The light is hingedly attached such that it can be tilted away from a face 44a of a housing. By excessively tilting a light, a shroud 60a attached to the light will swing away from an aperture 46a to expose components inside a housing, including a back portion of the light itself.

The above are combined to bring the solar light assembly 0a together into a low maintenance outdoor lighting solution. Wiring, which is usually just low voltage insulated wires that meet local codes, is not shown. The most preferred use of the solar powered light assembly of the present invention is as a street or park light, as shown in FIG. 9, having a pole 80 that is typically several meters taller than ground level. Additional or alternate features that make the solar light assembly more versatile or easier to use will be discussed throughout this description. Where reference numbers in one figure are the same as another figure, those reference numbers carry substantially the same meaning. In this specification, a reference number without a letter designation, such as "frame 30", is intended to describe that feature in any of the various drawing figures, such as "30a, 30b, 30c and 30d"; but a reference number identified in this specification that includes a letter designation, such as "frame 30a", is intended to only describe the feature shown in a figure that includes that particular letter designation. Preferred sizes, materials and methods of attachment will be discussed, but these preferences are not intended to exclude other suitable or functionally equivalent sizes, materials or methods of attachment.

A solar panel 20 that is well suited for use with the solar light assembly 0 of the present invention should be substantially impervious to harsh conditions. The preferred solar panel, shown in FIGS. 1,4,5,8, 10, 15, 19 and 24 is a flat panel that is formed in layers such that an array of solar cells are encased in a durable transparent material, such as a 100 watt or larger standard crystalline solar panel designed for use with 12 volt systems. The solar panel's perimeter is typically protected by a rigid border, which may also be used to support the solar panel. The solar panel's underside, opposite the collection surface, has a junction box 24 with electrical leads that carry the potential gathered by the collection surface of the solar panel. These electrical leads are connected to a system controller 72 that is electrically connected to a rechargeable battery that powers at least one light 70 of the system. The battery, not shown, is preferably kept in an underground battery container to limit the temperature extremes the battery will experience.

The top of a solar light assembly 0 must be covered to prevent the ingress of water, so the solar panel 20 also functions as a cover for the assembly. A frame 30 is used to protect and support the solar panel in a desired position. The frame has at least one large hole 36 that accepts a housing 40. It is understood that it may be desirable to precisely size the length and width of the frame of a solar light assembly so that it precisely fits a particular solar panel. The frame can be all one material, as shown in FIGS. 1-8, with a structural portion and a tray portion 34a being integrated such that formed sheet metal, thermoformed plastic, or other strong tray-like structure can be used. Alternatively, if a weak or thin material is used to form the tray portion of the frame, the structural portion, such as structural members that are welded or otherwise structured to be load bearing, can be secured to the tray portion. Structural members, if needed, should extend from the pole 80 to help bear the weight of any excess loads, such as snow or wind. The tray portion can be any desired material, such as plastic, sheet metal, metal meshing, or other material that can provide the bottom of the solar panel with good protection against a rock thrown by a vandal. The solar panel is secured to the frame using fasteners, such as tamper-resistant screws that go through edges 32 of the frame and secure to the rigid border of the solar panel.

For a flat mounted solar panel, edges 32*a* of the frame 30*a* are preferably high enough to conceal the solar panel 20 from view by someone on the ground, which may reduce the likelihood of vandalism being directed against the solar panel. The edges can be very short, preferably only a few centimeters high. Although edges are not absolutely necessary, they are preferred because they offer added protection to the solar panel while maintaining a uniform appearance for the solar light assembly. The tray portion of the frame additionally provides protection for wiring that extends from the battery. This wiring can simply be run through the pole and then routed over the tray portion and down into a housing 40 through a hole 36 in the frame. When viewed from ground level, the orientation that would normally be seen by someone walking under the solar powered light assembly, the tray portion 34 substantially frames a housing. FIG. 10 shows an example of how a housing 40*b* and frame 30*b* may be formed as a single part such that the sides of a housing integrally meet with the bottom of the frame.

Figure 4:
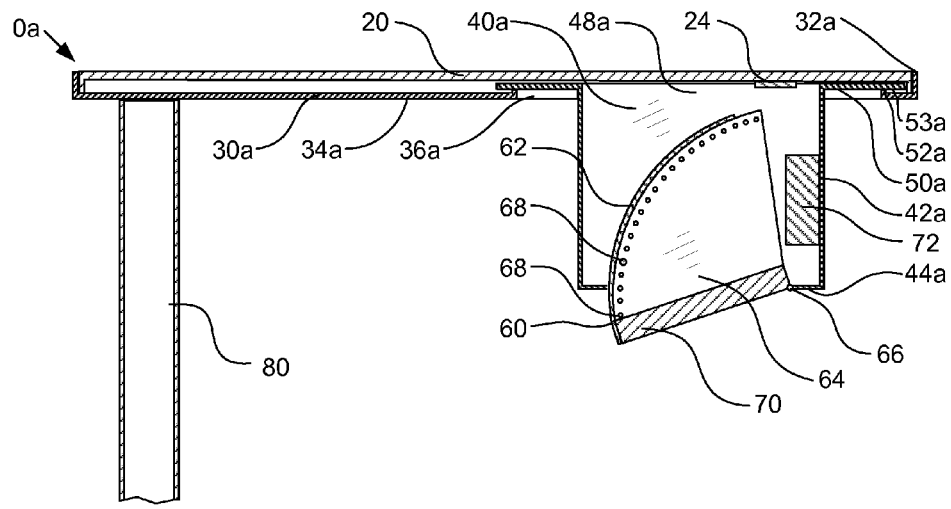
FIG. 4 is a cross section through line 3-3 of FIG. 3.

The tray portion of the frame 30 should have at least one drainage passageway 38, such as a groove cut through the tray portion, to prevent water from collecting in the solar light assembly. Obviously, if the tray portion is a mesh material, then there is no need to provide additional drainage. If drainage might be a problem, a rain barrier ridge 52 should also be provided to divert water so it doesn't flow into a housing 40. The rain barrier ridge can just be an additional structure on the tray that is raised relative to a surface of the tray portion that may collect water. As shown in FIG. 4, the rain barrier ridge can be formed at or adjacent the perimeter of the hole 36*a* in the frame such that a disc 50*a* will be raised relative to the tray portion of the frame. The resulting gap 53*a* allows water to flow under the disc before being diverted away from the hole in the frame. Because any water that flows under the gap cannot then flow into a housing, the rain barrier ridge could also include drainage passageways, but this may cause unwanted mineral buildup on the outside of a housing.

Figure 7:
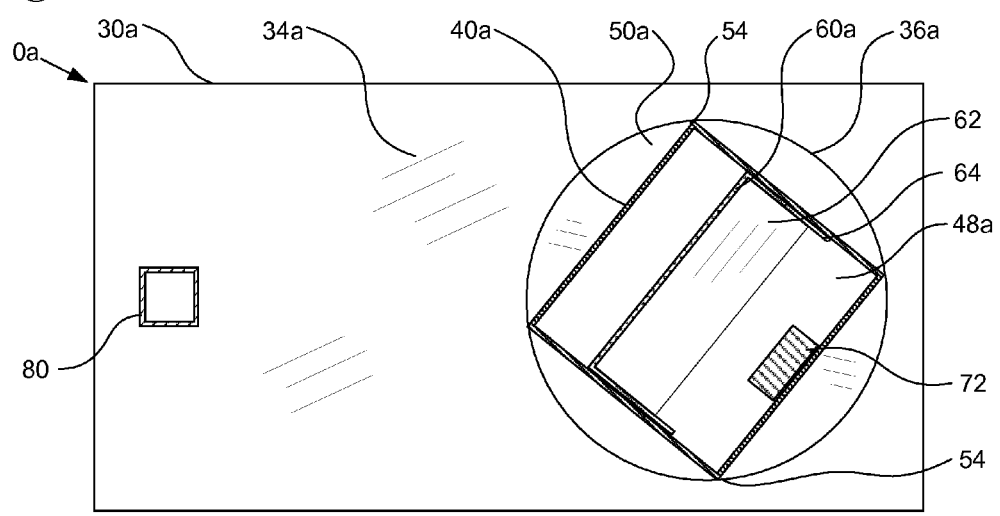
FIG. 7 is a cross section through line 6-6 of FIG. 6.

A housing 40 is made from a durable and rigid material that may be stamped, injection molded, or otherwise formed. Suitable materials include plastic, aluminum, steel, polyester, fiberglass, nylon, vinyl, carbon fiber materials, polycarbonate, or other composite materials that are substantially impervious to fracturing. There must be enough rigidity in the material so that an installed housing maintains its shape even when being rotated to a desired position. The most preferred method of making a housing is by thermoforming it from a single sheet of ABS plastic or polycarbonate. The thickness of the sheet will usually be between about five and ten millimeters, but will depend upon the material that is used and the overall size of a housing. Although a housing can be virtually any desired shape, the most preferred shape, shown in FIGS. 1-7, has rectangular ends that are separated by sides 42*a*. One of the ends has a face 44*a* that substantially frames an aperture 46*a*, which is a cutout for a light 70. Because it will be covered by the solar panel, a cavity 48*a* at a top portion of a housing is left open so the housing can easily be thermoformed. The length of the longest diagonal of one of the ends of a housing defines the minimum diameter of a hole 36*a* in the frame 30*a* so that a housing can be installed through the hole, noting that the ends of a housing do not need to be the same size or shape. With a housing installed in the hole, as shown in FIG. 1, the corners defined by the sides of the housing act to center it about the hole, as shown in FIG. 3. The open end of the housing can freely rotate in a plane substantially parallel to the plane of the tray portion of the frame, as shown in FIG. 7. If the clearance between the corners of a housing and a hole are tightened, that housing will be more difficult to rotate, which may be desirable if there is any concern that the weight of the housing will not adequately prevent it from rotating by the force of a wind.

A disc 50*a* extends outwardly from the open end of a housing 40*a*, as shown in FIGS. 1-7. Preferably, the disc and housing are thermoformed as a single part. The diameter of the disc is greater than the diameter of the hole 36*a*, preferably by at least one centimeter, more if a gap 53*a* for water is desired. The disc, which substantially rests against the frame 30*a*, prevents the housing from slipping through the hole and otherwise supports the housing while masking the excess of the hole not filled by the housing, as shown in FIGS. 3 and 7. The weight of the housing should provide adequate frictional force against the frame to securely hold the housing in a desired position, but a fastener can be used to fix the disc relative to the frame. Where there is a rain barrier ridge 52*a* adjacent the hole, the disc is rotatable against the rain barrier ridge itself. Alternatively, the rain barrier ridge could be built into the disc by inverting the rain barrier ridge such that it would be rotatatable against the tray portion of the frame, but this could raise the earlier concern regarding mineral buildup forming on the outside of the housing if too much water leaks under the rain barrier ridge.

Figure 5:
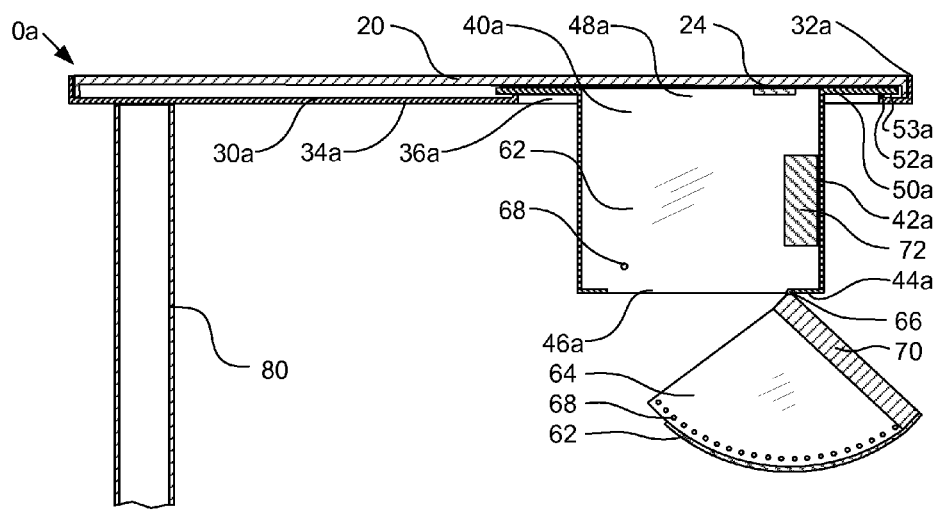
FIG. 5 is a cross section view similar to FIG. 4, but showing the light and shroud tilted to expose the contents of the housing.
Figure 6:
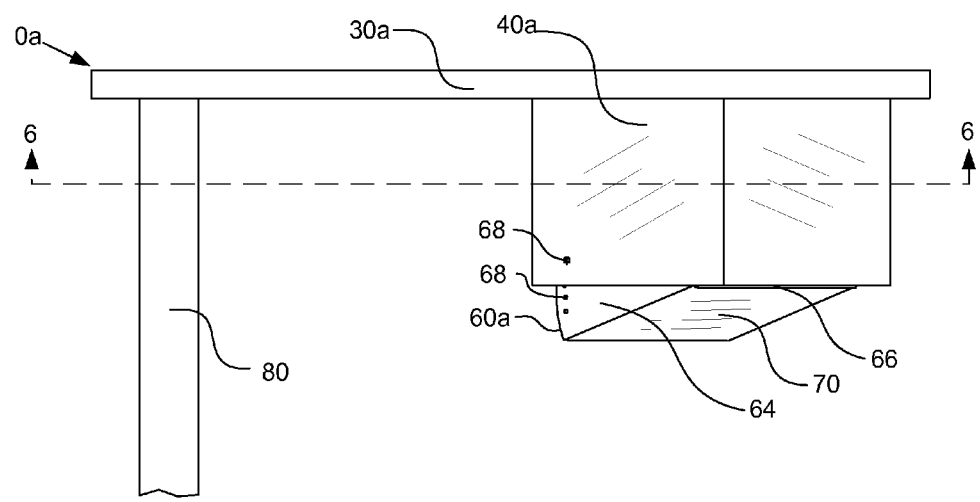
FIG. 6 is a side view similar to FIG. 2, but showing the housing rotated such that the light will be cast in a different direction.

A shroud 60 is housed within a housing 40 when the illumination cast by a light 70 is vertical, herein defined to be zero degrees of tilt. When a light is tilted away from the face 44 of a housing, the shroud similarly swings out of the housing to conceal the aperture 46 that would otherwise be exposed in the absence of a shroud. A shroud has an arcuate portion 62 that is substantially a uniform distance from a hinge 66. The shroud also has triangular sides 64 at opposing ends that cover the area between the arcuate portion and the hinge. The triangular sides are adjacent opposing sides of a housing, preferably abutting the sides 42 of a housing. A formed seal or weather stripping can be used between a housing and shroud to prevent insects from entering the housing. The aperture of the housing is covered by the light and the shroud at any angle between about zero degrees of tilt and about ninety degrees of tilt, ninety degrees being where the illumination cast by the light is horizontal. The degrees of tilt can be fixed in a desired position by fasteners that pass through the housing and secure to the triangular sides, as shown in FIG. 2. Optionally, a tab projecting from the face of the housing could be provided such that a fastener can secure to the arcuate portion of the shroud. Numerous pre-drilled adjustment holes 68, shown in FIGS. 1,2,4,5 and 6, can offer quick and easy adjustment of the tilt. FIG. 4 most clearly shows how the triangular sides can project farther into the housing than the arcuate portion to provide a means for fastening the shroud to the housing at or near ninety degrees of tilt. The arcuate portion of the shroud only covers about the first ninety degrees of tilt. Beyond ninety degrees of tilt, the light will illuminate the sky, which is typically not desirable for a street or park light. As the light is increasingly tilted beyond ninety degrees, the aperture of the housing becomes increasingly exposed as the arcuate portion swings away from the aperture. With the shroud tilted away from the aperture, as shown in FIG. 5, electronics inside the housing can be accessed and serviced from someone positioned under the solar light assembly, thereby avoiding the need to remove the solar panel 20 that covers the solar light assembly 0a.

The light 70 is preferably an array of bright white light emitting diodes (LEDs) that are sealed into a weatherproof acrylic brick, but other suitable or alternative light sources can be substituted. A 120 LED brick light is well suited for the solar light assembly 0 because it provides a uniform dispersion of light that is adequate for most uses. The light is mounted near or to the face 44 of the housing 40 using at least one hinge means 66. The light is preferably also fixed to the shroud 60, such as by using fasteners or adhesive. When the light is tilted well beyond ninety degrees, the back of the light is accessible. If desired, the system controller or other electronics can be mounted to the back of the light, such as with fasteners or adhesive. Alternatively, as shown in FIGS. 3,4,5, 7,8 and 10, an appropriately sized holder 74 can be fixed to one of the sides 42a or 42b of the housing 40a or 40b, or even fixed to the back of the light, which will provide easier access to electronics that can simply be slipped out of their holder to be tested or replaced. Wiring can just hang loosely within the housing because once the rotation and tilt of a light are fixed, there should not be any reason the wiring will undergo additional movement.

In conjunction with using an energy efficient light, an energy-conserving switch, not shown, can be used with the solar powered light assembly. Examples of energy-conserving switches include motion sensors, dusk-to-dawn photoelectric sensors, timers, remote controls, and combinations of the switches just mentioned. Probably the most popular and useful of the switches are motion sensors that have a timer. Motion sensors need to be capable of "seeing" the surroundings, so the sensor is preferably mounted in or adjacent the light. Adding a recess into an acrylic brick light that accepts a sensor would be ideal. The sensor can be adjusted for a desired sensitivity and coverage area by accessing the back of the light when it is tilted well beyond ninety degrees. The sensor is typically electrically connected between the light source and a rechargeable battery.

A rechargeable battery is the power supply for a light. Most solar panels that could be used with a solar light assembly are designed for 12 volt systems, so a 12 volt battery should be used. A 100 Amp hour or larger sealed maintenance-free lead-acid battery would be suitable for dusk to dawn applications. When such a large battery is used with a system of the present invention, it is only recommended to locate the battery remotely rather than attempting to install the battery into a housing. A system controller 46 should be electrically connected between the rechargeable battery and the solar panel. A system controller with a built in low voltage disconnect device will protect the battery from excessive charge or discharge. Morningstar Corporation, Washington Crossing, Pa., offers simple 12 volt system controllers, such as their SunLight™ models, which are ideally suited for solar light assembly applications. As already discussed, the system controller can be housed inside the housing so it can be easily accessed for service or replacement.

A pole 80 used to mount the solar light assembly several meters above ground level can be any common pole, such as four inch rectangular steel tubing. Any known method for erecting a pole and running wiring up the pole can be implemented. Brackets and/or other mounting hardware, not shown, may be required to properly secure the frame to the pole.

Figure 8:
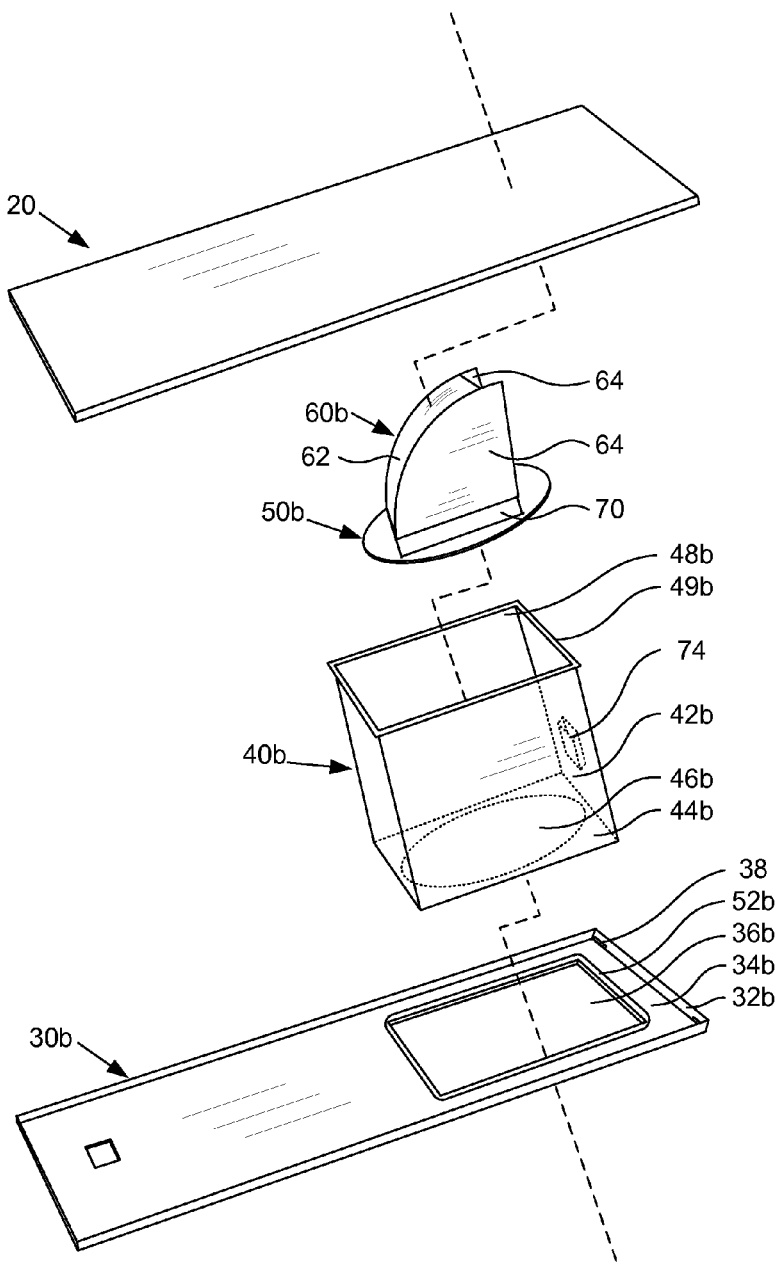
FIG. 8 is an exploded perspective view of an alternate embodiment of a solar light assembly with the disc being rotatable against the housing rather than against the tray.
Figure 15:
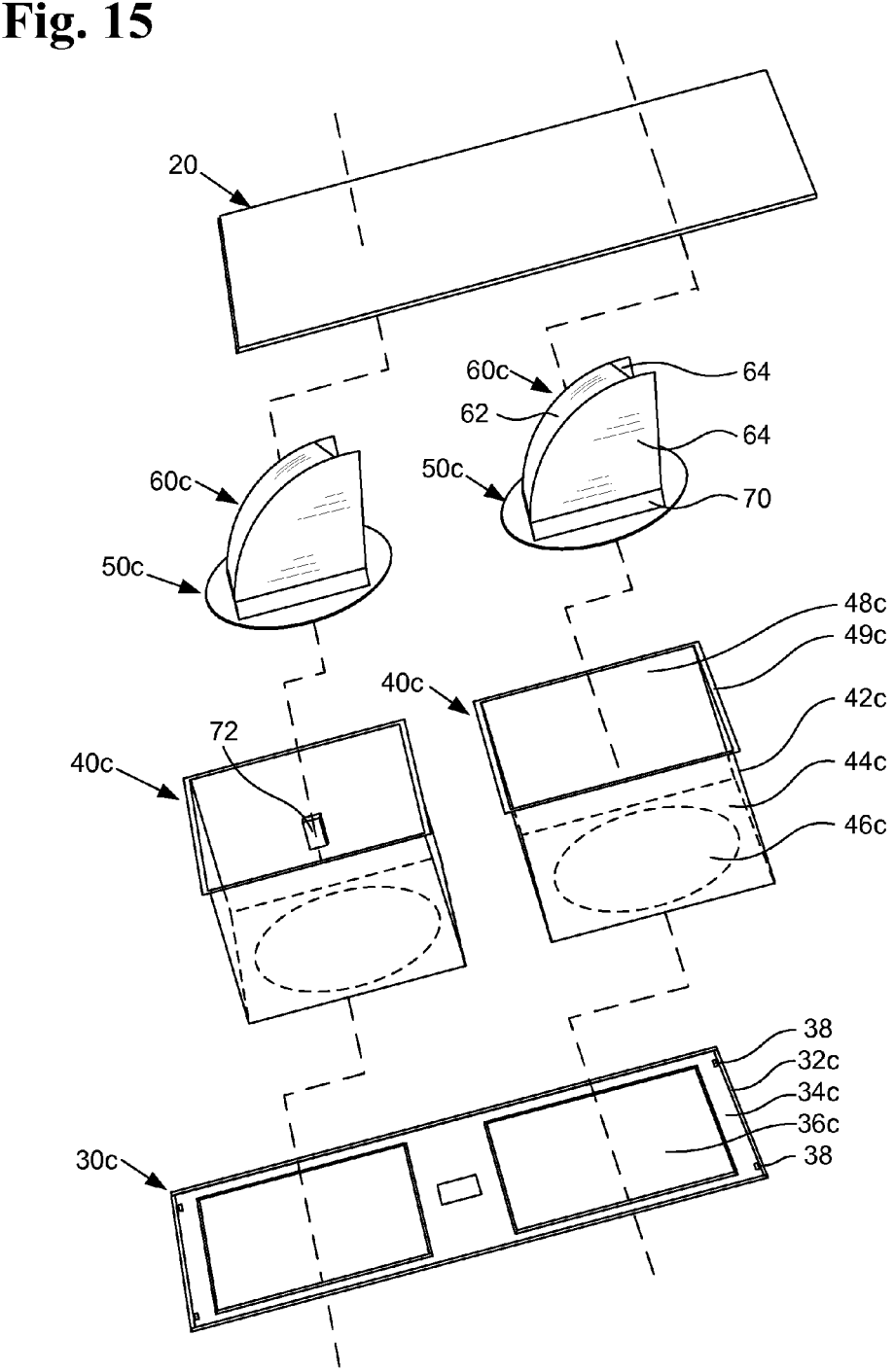
FIG. 15 is an exploded perspective view of an alternate embodiment of the present invention that is similar to the embodiment of FIGS. 12-14.
Figure 19:
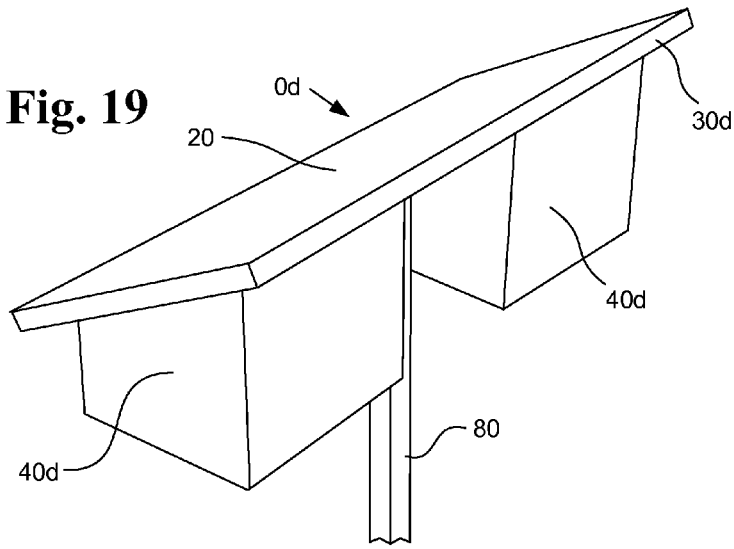
FIG. 19 is a perspective view of an alternate embodiment of the present invention using a frame mounted with a horizontal posture.
Figure 20:
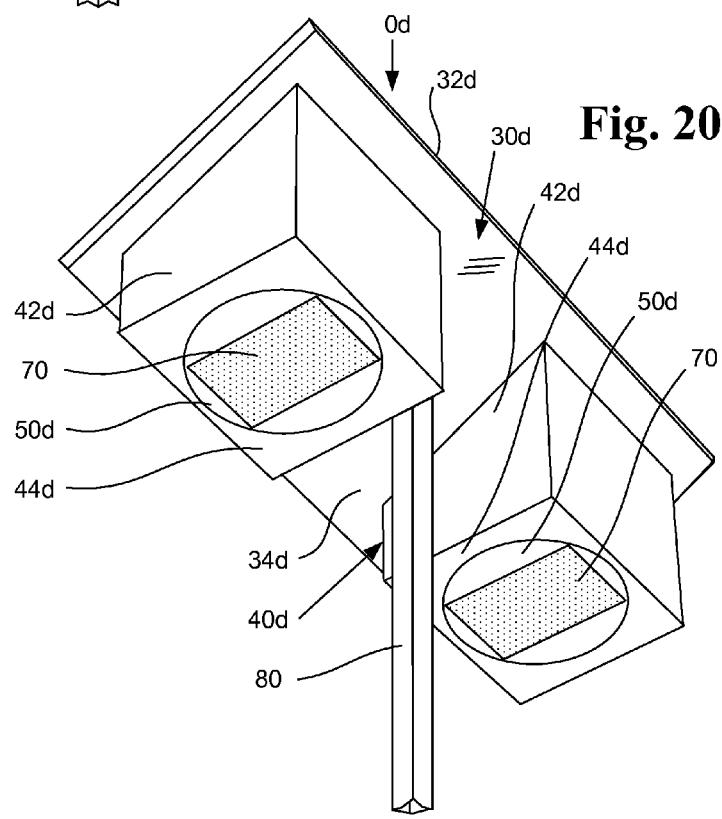
FIG. 20 is a different perspective view of the alternate embodiment of FIG. 19
Figure 21:
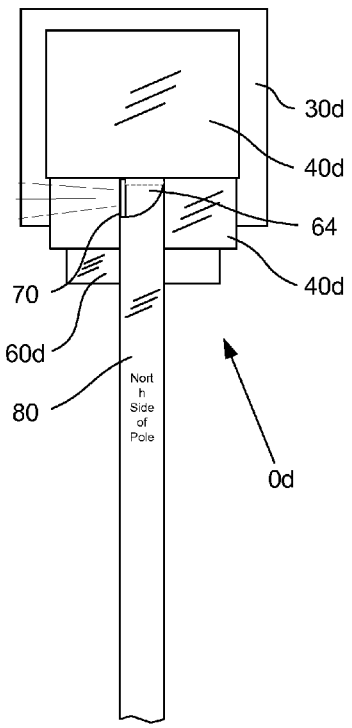
FIG. 21 is a side view of an alternate embodiment of the present invention using a frame mounted with a vertical posture.
Figure 22:
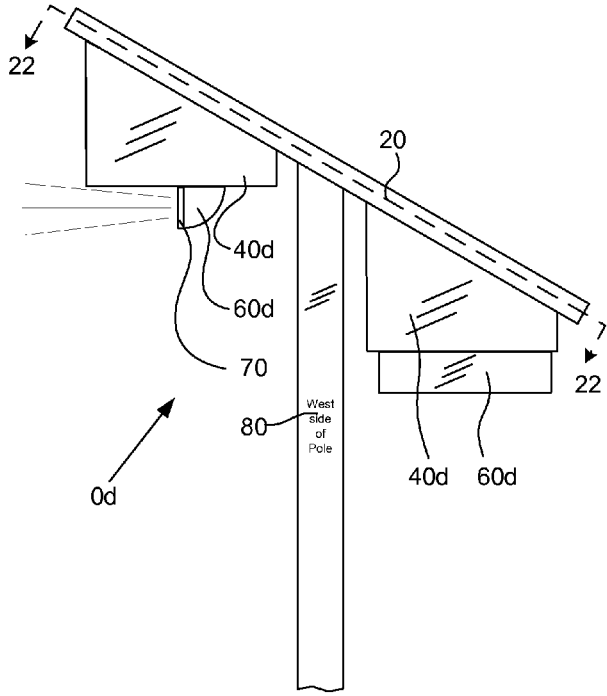
FIG. 22 is a front view of the alternate embodiment of FIG. 21.
Figure 23:
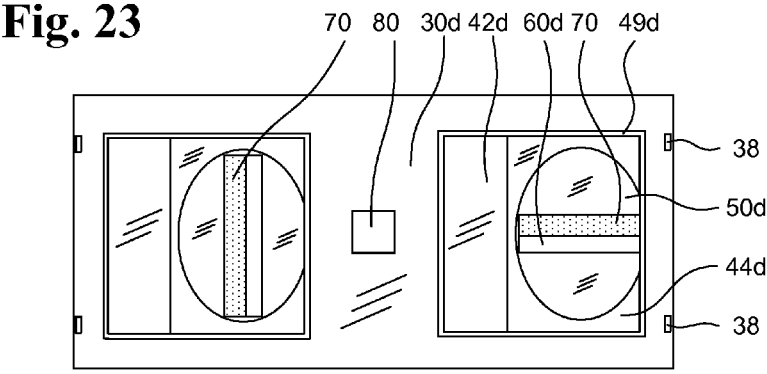
FIG. 23 is a cross section, substantially looking down, through line 22-22 of FIG. 22.
Figure 24:
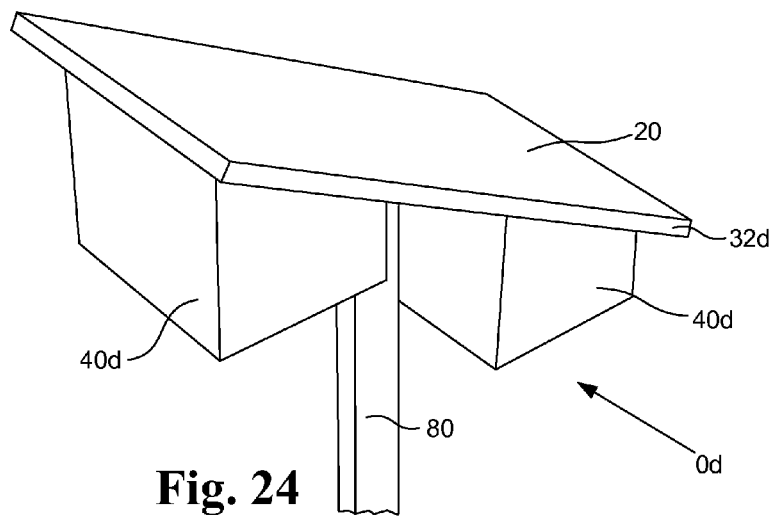
FIG. 24 is a perspective view of the alternate embodiment of FIGS. 21-23.
Figure 25:
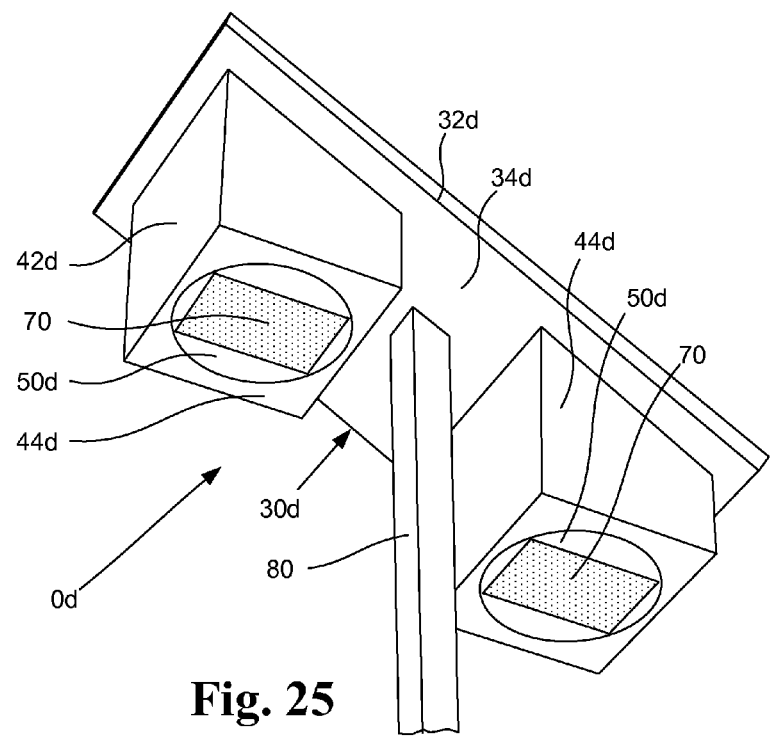
FIG. 25 is a different perspective view of the alternate embodiment of FIGS. 21-24.

FIGS. 8-11 show first alternate embodiments that are similar to the solar light assembly of FIGS. 1-7, except that the rotational adjustment is located at the bottom of a housing rather than at the top of a housing. The housing 40b in FIG. 8 has a lip 49b that supports the housing against the hole 36b of the frame 30b. The frame can otherwise have all of the additional features already described above. The housing can be rectangular, as shown in FIG. 8; cylindrical, as shown in FIGS. 9-11; or any other desired shape. The aesthetic benefit of the alternate preferred embodiment of FIG. 8 is that a rectangular housing will remain aligned with a rectangular frame even if the light is rotated, unlike FIGS. 6 and 7. The drawback is that the housing will be larger relative to the size of the light because the disc 50b is inside the housing. In the various alternate preferred embodiments, the disc rests adjacent the aperture 46 of the housing such that the disc is supported by the face 44 of the housing. The light 70 is hingedly attached to the disc itself, inside an opening 56 that passes through the disc. The shroud 60 is positionable within the opening in substantially the same way the shroud was positionable within the aperture in FIGS. 1-7, already described. Rather than having the pre-formed adjustment holes 68 previously shown, FIGS. 8-12 show how a tab 58 that protrudes from the disc is fastened, such as with a self-tapping screw, to the arcuate portion of the shroud so the light will maintain a desired tilt. Alternatively, the disc could be similarly fastened to the triangular portions of the shroud.

In FIG. 8, the system controller is held adjacent a side 42b of the housing 40b using a holder 74. Because the disc 50b is rotatable relative to the housing, the line of sight for someone servicing a system controller will not always favor viewing the side of the housing on which the system controller and holder are located. To correct this orientation problem, the disc can simply be rotated until the hinge of the light is closest to the holder, thereby making the holder easily visible and accessible.

In FIGS. 9-11, there are two housings 40b, both being cylindrical, mounted to the same frame 30b. The frame is designed to support a solar panel 20 that is postured toward south for a more efficient system. A center mounted pole 80 more evenly distributes the weight of the solar light assembly. The sides 42b of the housings are sloped as needed to accommodate the tilted solar panel and frame. It should be noted that a sloped housing that has its disc at the bottom of the housing allows rotation of a light to occur in a horizontal plane. The frame and both housings can be thermoformed as a single piece part, as shown, including the rain barrier ridge 52b. The lights used in FIGS. 9-11 are narrower than in the first preferred embodiment, so a tilted light won't swing very far away from the face 44b of a housing. The cavity 48b of a sloped housing has less room for servicing electronics housed within the housing, so the holder 74 for the system controller 72 may be mounted to the back of the light 70, as shown in FIGS. 10 and 11.

The second preferred embodiment has three basic configurations, shown in FIGS. 12-15, 16-20 and 21-25. Installation challenges are common for solar light assemblies because areas that need to be illuminated are frequently shaded by trees or structures, not substantially North or South of a desired pole location, susceptible to vandalism, or there are architectural/aesthetic rules that restrict the use of solar panels. The solution to most installation challenges is to provide additional versatility regarding the posture of a solar panel. FIGS. 12-15 show a two light system that is otherwise very similar to the system of FIG. 8, already described, including the advantages of a having a solar panel 20 and frame 30c that are flat mounted, such as the disguised presence of a solar panel, an additional level of protection against vandalism, shorter housings 40c that can accommodate narrower lights 70, and a more aesthetically pleasing presence. FIGS. 16-20 show a frame and solar panel characterized by a horizontal posture, which is more efficient because the solar panel is southernly aslant, is well suited for illuminating areas more to the North or South of the pole 80, and has all of the rotation and tilt capabilities already previously described. FIGS. 21-25 show a frame and solar panel characterized by a vertical posture, which is as efficient as a horizontal posture, but better suited for illuminating areas more to the East or West of the pole.

An advantage of the second preferred embodiment is the ability to interchange parts. The same pole 80, frame 30 and solar panel 20 can be used with any of the three shown configurations without needing to modify anything except the slope at the top of the pole. The holes 36 in the frame that accept the housings 40 are preferably square. There is no slope associated with the housings used in FIGS. 12-15, so the ends of these housings can be square. FIGS. 16-25 can all use substantially identical and interchangeable sloped housings. Because parts are interchangeable, there are significant manufacturing and inventory savings while providing a high level of versatility during the installation of a solar light assembly. For example, an installer can convert a solar light assembly having a vertical posture to one having a horizontal posture by separating the frame from the solar panel, housings and pole, and then reassembling these parts after simply rotating the frame and solar panel ninety degrees. If the top of a sloped housing is square, the bottom and face of a sloped housing are preferably rectangular. The face of housing could alternatively be round, or any other shape that fits through the hole, if desired. Similarly, the lip 49 of a housing can be extended in any needed direction if there is a desire to make the top of the housing something other than symmetrical.

For even greater versatility, but arguably less aesthetic, sloped housings can be used with a flat mounted solar panel, or housings not having a slope can be used with a postured solar panel. Along those lines, there are numerous less conventional-looking configurations for more expressive people. For configurations that do not keep the face of a housing in a horizontal plane, additional fasteners may be required to prevent a light from shifting. If desired, a small motor or solenoid could be used to adjust the tilt of the light such that the light is only tilted into a desired position at night, when the light is on, but then recessed back into the housing during the daytime.

While a preferred form of the invention has been shown and described, it will be realized that alterations and modifications may be made thereto without departing from the scope of the following claims. For example, while the slope of the various postured frames and solar panels shown in the drawings is about thirty degrees, that slope was somewhat arbitrarily selected, but it represents a compromise between efficiency, aesthetics and vandalism prevention. A steeper slope is more efficient in the United States, but vandalism becomes more likely and the solar panel becomes more visually offensive as the slant increases.

What is claimed is:

1. An outdoor solar light system comprising:
    a frame that is substantially positioned in a first plane;
    a solar panel that is substantially positioned over the frame;
    a first set of housings, each housing having a face, sides and a lip;
    a set of lights, each light mounted substantially in or adjacent a face;
    wherein each housing is positioned in the frame and supported by the lip; and
    wherein the face and the lip of each housing lie in intersecting planes such that each housing can be removed from the frame, rotated, and then repositioned in the frame.

2. The system of claim 1 further comprising a set of discs that are hingedly fastened to the lights, each disc positioned inside of one of the housings such that each disc can be rotated against one of the faces.

3. The system of claim 1 wherein each of the faces substantially lies in a single horizontal plane.

4. The system of claim 1 wherein each of the faces substantially lies in a different horizontal plane.

5. The system of claim 1 wherein the first plane is at least partially inclined with respect to a horizontal plane.

6. The system of claim 1 further comprising a second set of housings, interchangeable with the first set of housings, characterized by the face and the lip of each housing lying in parallel planes.

7. The system of claim 1 wherein the frame is characterized by at least two holes for accepting the first set of housings.

8. The system of claim 7 further comprising a pole that is fastened to the frame substantially between the at least two holes.

* * * * *